(12) United States Patent
Cruz

(10) Patent No.: US 12,515,475 B2
(45) Date of Patent: Jan. 6, 2026

(54) STACKABLE TRAY AND STACKABLE FOLDER FOR FILING

(71) Applicant: Felipe Cerda Cruz, Santo Domingo (DO)

(72) Inventor: Felipe Cerda Cruz, Santo Domingo (DO)

(73) Assignee: Felipe Alberto Cruz Cerda, Distrito Nacional (DO)

( * ) Notice: Subject to any disclaimer, the term of this patent is extended or adjusted under 35 U.S.C. 154(b) by 492 days.

(21) Appl. No.: 17/608,137

(22) PCT Filed: Aug. 12, 2020

(86) PCT No.: PCT/DO2020/050004
§ 371 (c)(1),
(2) Date: Nov. 1, 2021

(87) PCT Pub. No.: WO2021/028004
PCT Pub. Date: Feb. 18, 2021

(65) Prior Publication Data
US 2022/0363085 A1     Nov. 17, 2022

(30) Foreign Application Priority Data
Aug. 14, 2019  (DM) ........................ DOP2019-0208

(51) Int. Cl.
*B65D 5/20*     (2006.01)
*B42F 7/12*     (2006.01)
*B65D 5/00*     (2006.01)

(52) U.S. Cl.
CPC .............. *B42F 7/12* (2013.01); *B65D 5/0015* (2013.01); *B65D 5/006* (2013.01)

(58) Field of Classification Search
CPC ... B42F 7/10; B42F 7/12; B65D 5/001; B65D 5/002; B65D 5/005; B65D 5/006; B65D 5/0065; B65D 5/0075; B65D 5/5026; B65D 5/5033; B65D 5/2004; B65D 5/2009;
(Continued)

(56) References Cited

U.S. PATENT DOCUMENTS 2,490,269 A * 12/1949 Johnson .................... B42F 7/12
                                                        206/509
2,628,012 A *  2/1953 Goldsholl ............ B65D 5/6697
                                                        229/152
(Continued)

FOREIGN PATENT DOCUMENTS

CN       108248988 A     7/2018
DE    202004001311 U1 *  5/2004 ................ B42F 7/12

*Primary Examiner* — Nathan J Newhouse
*Assistant Examiner* — Nina K Attel

(57) ABSTRACT

The invention relates to a stackable tray comprising an outer sheet with foldable tabs that fold around an inner sheet, and columns glued to the inner sheet. The outer sheet is glued to the columns and the tabs are glued to the inner sheet. The folder is the same tray but with an added cover glued to the left side of the tray. The trays or folders can be stacked one on top of the other, the inner sheet being supported on the columns, the columns being supported one on top of the other. The trays have side labels that allow them to be identified from the side when they are stacked, and a front label that allows the cover to be identified in the case of a folder.

8 Claims, 5 Drawing Sheets

(58) Field of Classification Search
CPC ...... B65D 5/0015; B65D 5/007; B65D 5/321; B65D 5/20
USPC ........ 229/67.1, 67.4, 167, 191, 194, 125.08, 229/125.33, 125, 19, 141, 14, 5, 147, 229/149, 154, 915, 918, 919
See application file for complete search history.

(56) References Cited

U.S. PATENT DOCUMENTS

| | | | | |
|---|---|---|---|---|
| 3,006,523 | A * | 10/1961 | Keith | B65D 5/0015 206/499 |
| 4,911,311 | A * | 3/1990 | Nagai | A47F 5/116 211/11 |
| 5,454,471 | A * | 10/1995 | Norvell | B32B 5/22 126/400 |
| 6,213,298 | B1 * | 4/2001 | Nguyen | B65D 5/422 229/172 |
| 6,302,319 | B1 * | 10/2001 | Peeples | B65D 5/46016 229/122 |
| 8,533,984 | B2 * | 9/2013 | Flynn | B42F 21/00 40/641 |
| 8,960,527 | B2 * | 2/2015 | Hui | B65D 5/4283 229/122.34 |
| 9,844,281 | B2 * | 12/2017 | Fernandez | A47F 5/116 |
| 2010/0314436 | A1 * | 12/2010 | Tao | B65D 5/324 229/199 |

* cited by examiner

STACKABLE TRAY AND STACKABLE FOLDER FOR FILING

BACKGROUND OF THE INVENTION

Technical Field

The present invention relates to a tray and a file folder formed from an outer sheet, an inner sheet, square and I-shaped columns and a cover, when it is a folder, and is directed to the field of office supplies, specifically to devices for containing, protecting or classifying paper articles. The device has its application in any activity that requires storing or classifying any paper articles such as documents, plans, invoices, etc.

Background Art

Currently there are ring binders of different sizes for different amounts of sheets and there are document trays generally with divisions of the same height. The proposed trays and folders are a different alternative to those that exist to contain, protect or classify paper articles, for example in the event that you want to classify and store documents without perforation, and with the advantage that they can be stacked one on top of another and be identified through a side label.

In 1979 U.S. Pat. No. 4,236,740A by John F. Sorenson and Frank W. Locke, a file storage box is shown to be formed from a sheet of cardboard. The blank consists of a centrally located bottom wall panel having side wall panels foldably connected thereto. Each of the centrally located side and bottom wall panels has an end wall panel extending from a transverse edge thereof, such that when the side wall panels are folded 90° with respect to the bottom wall panel, the end wall panels at the transverse edges of the side walls and bottom wall can overlap and lock together. Connected to the outer longitudinal edges of each of the side wall panels is an upper wall panel substantially half the width of the lower panel located in the center. The top wall panels are adapted to be folded 90° relative to the side walls to form a cover for the box. The longitudinally extending tabs extend from the transverse edges of each of the top wall panels and can be inserted into an opening in the end walls to lock the top wall panels in place in the box.

In Haruo Okamoto's 1991 U.S. Pat. No. 5,183,200A patent, a box container is shown having a bottom plate in which a crack is formed through one pair of opposite angles and a fold runs through each center of the other pair of opposite angles and has side plates, each of which is connected in one piece to the periphery of said bottom plate, in which the box container is pressed to be flat and not bulky in transport and storage and, in In the case of assembling this box container, the bottom plate unfolds to be flat along the folds that were provided in the bottom plate of said box container, and furthermore, the entire bottom plate is fixed by gluing a quadrangular back plate to it.

In 1994 U.S. Pat. No. 5,456,366A by Gregory J. Wenkman, a multi-level tray for letters or other content is shown that includes two or more separate trays having upwardly extending side rails and an upwardly folded backstop. Other attributes can also be included for ease of access and installation. The multilevel tray of the present invention can be injection molded as a unitary form.

David Yang's 2008 U.S. Pat. No. 6,845,903B2 shows a folder-type file tray, assembled from a single piece of cardboard. The file tray can be flattened to a small size during storage or transport. It can also be assembled in different ways for different uses. The first form of the file tray is an open top box with a front opening for use as a conventional file tray. The second form of the file tray is an open top box without a front opening, that is, surrounded by four side walls for use as a desktop toolbox. The third form of the file tray is an open top box with a folding closing lid for use as a storage box. Additionally, the file tray of the present invention can be directly stacked together in multiple numbers without additional support means.

BRIEF SUMMARY OF THE INVENTION

The stackable tray presented comprises an outer sheet with folding tabs that fold around an inner sheet and columns that are adhered with glue to the inner sheet. The outer sheet in turn is glued to the columns and the tabs glued to the inner sheet. The thickness of the inner sheet will vary depending on the number of sheets that it has to support, this thickness must be that required so that the inner sheet can support the sheets without being deflected or deflection by the load is minimal. In the case of the folder, it is the same tray, only adding a cover that is glued to the left side of the tray.

Both the trays or the folders can be stacked one on top of the other, leaving the inner sheet resting on the columns and in turn the columns resting one on top of the other. The trays have side labels that allow identifying them laterally when they are stacked and a front label that allows identifying the cover in the case that it is a folder.

DETAILED DESCRIPTION OF THE INVENTION

Figure 1:
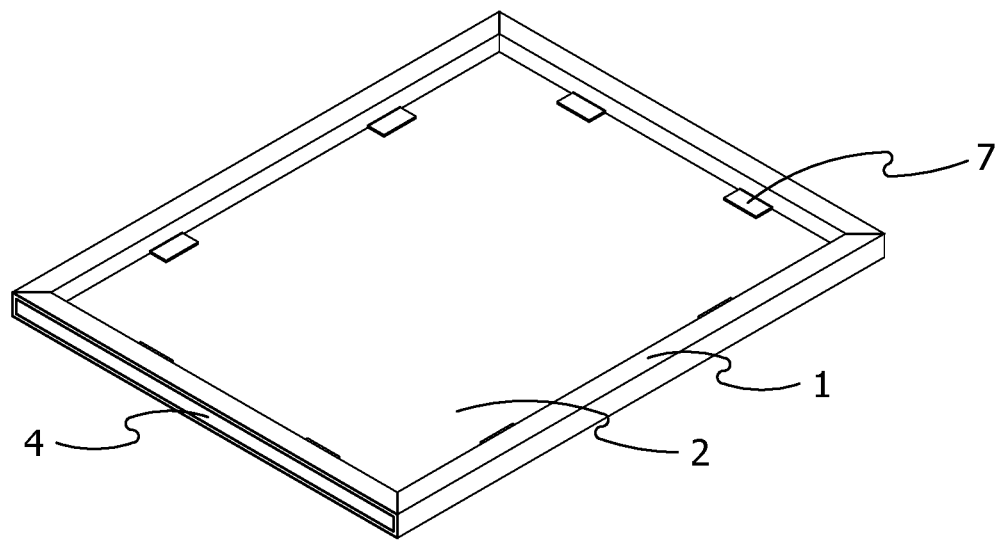
FIG. 1. Is a perspective view of the tray with the folded outer sheet, the inner sheet and the side label.

FIG. 1. Is a perspective view of the tray with the outer sheet 1 folded forming a frame parallel to the inner sheet 2, the inner sheet 2 and the side label 4. The tabs 7 are glued to the inner sheet 2.

Figure 2:
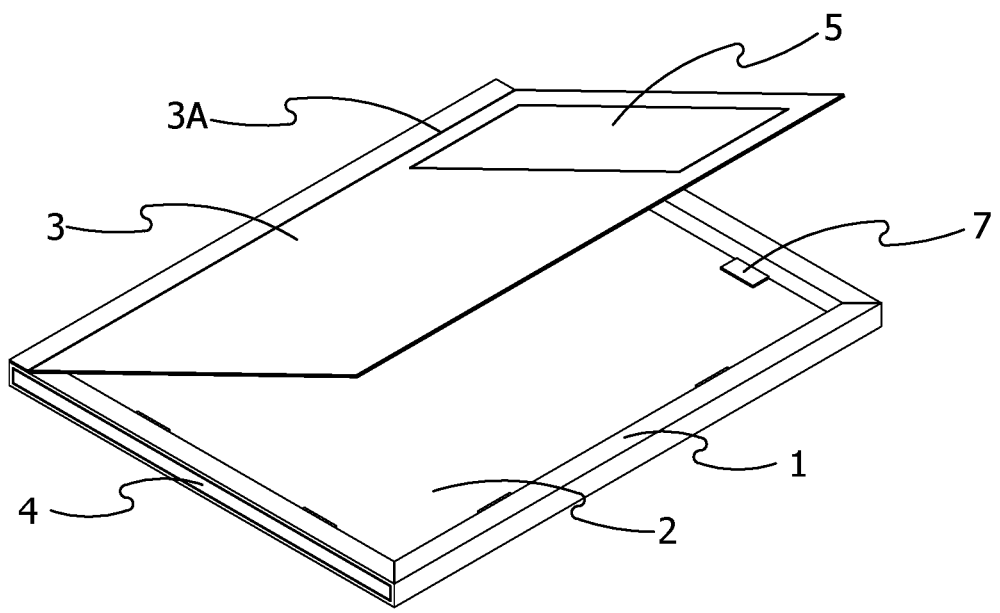
FIG. 2. Is a perspective view of the folder with the folded outer sheet, the inner sheet, the side label and the cover with the front label.

FIG. 2. Is a perspective view of the folder with the outer sheet 1 folded forming a frame parallel to the inner sheet 2, the inner sheet 2 and the side label 4. The tabs 7 are glued to the inner sheet 2. The cover 3 is glued to a portion of the frame of the tray, the cover 3 has a fold line 3A to open and close the cover 3 and also has a front label 5 to identify the file.

Figure 3:
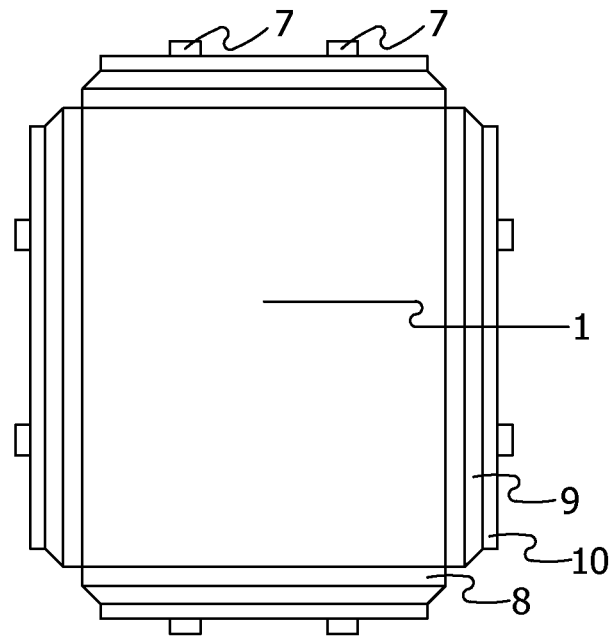
FIG. 3. Is a plan view of the unfolded outer sheet with the foldable tabs.

FIG. 3. Is a plan view of the outer sheet 1 without folding with the folding tabs 7, 8, 9, 10. The size of the folding tabs 8,10 will vary depending on the height of the tray or folder, the higher the tray or folder, the wider the folding tabs 8,10 will be. The outer sheet 1 could be made of manila paper, kraft paper, thin cardboard (cardboard), glossy cardboard, cardboard, plastic or any other material that can be folded and offers protection to the documents.

Figure 4:
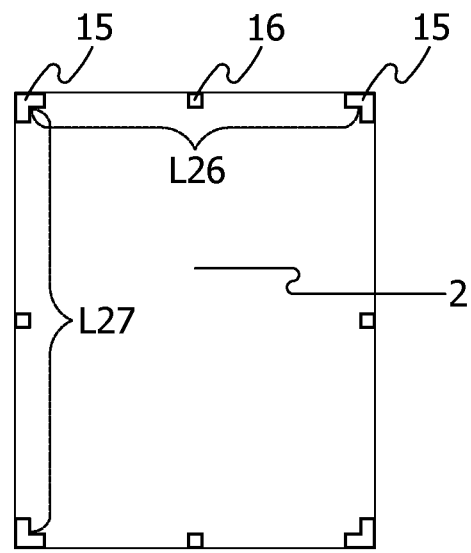
FIG. 4. Is a plan view of the inner sheet with the columns.

FIG. 4. Is a plan view of the inner sheet 2 with the columns 15,16. The distance L26 will be 8.5 inches plus a slight clearance for letter and legal size trays and folders. The distance L27 will be 11 inches plus a small clearance for letter-size trays and binders. The inner sheet 2 could be made of gray cardboard, kraft cardboard, corrugated cardboard or any other material that offers resistance to deflection, to support the weight of the documents.

Figure 5:
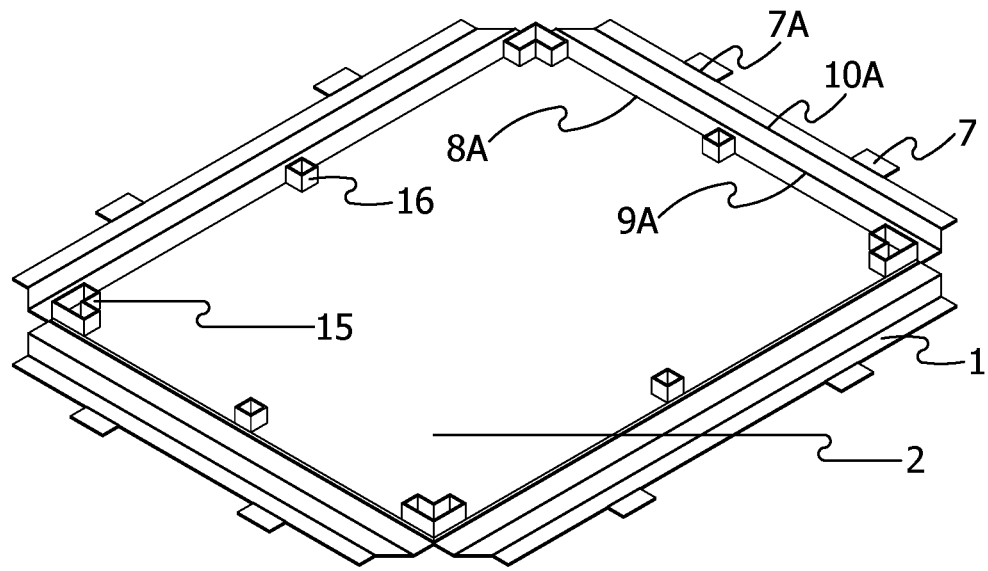
FIG. 5. Is a perspective view of the unfolded outer sheet, the inner sheet, the columns and the fold lines of the folding tabs.

FIG. 5. Shows a perspective view of the unfolded outer sheet 1, the inner sheet 2, the columns 15,16 equally distributed at midpoints of the four sides of the inner sheet 2 and on the four corners of the inner sheet 2, and the fold lines 8A,9A,10A,7A of the folding tabs. In this view, the complete assembly process of the tray can be interpreted, first the columns 15,16 are glued to the inner sheet 2, then the folding tabs are folded along the fold lines 8A,9A,10A, 7A and glued to the columns 15,16 and finally the tabs 7 are glued to the inner sheet 2. This same procedure will be used to assemble the trays and folders of different sizes and heights, for the different sizes of documents, letter, legal, tabloid etc.

Figure 6:
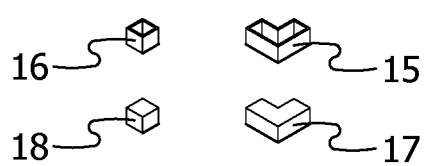
FIG. 6. Is a perspective view of the hollow and solid columns, square and L-shaped.

FIG. 6. Is a perspective view of the hollow 15,16 and solid 17,18, square and L-shaped columns. These columns 15,16, 17,18 serve as support so that the trays or folders do not collapse when they are stacked one on top of the other. The height of the columns 15,16,17,18 will depend on the height that the folder is to be manufactured. The hollow columns 15,16 and solid 17,18, square and in L, could be made of cardboard, pressed wood, wood, plastic or any other material that offers resistance to compression, so that the trays or folders are not squashed when stacked on top of each other.

Figure 7:
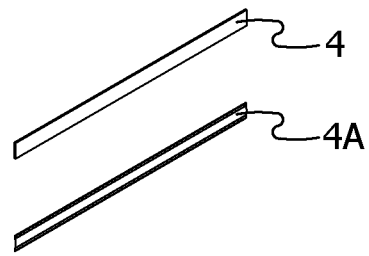
FIG. 7. Is a perspective view of the side tag and tag holder.

FIG. 7. Is a perspective view of the side label 4 and the label holder 4A. The side label 4 could be made of paper and stick to the folder or tray. The tray or folder may or may not have a label holder 4A to insert a label into it so that it can be changed if desired.

Figure 8:
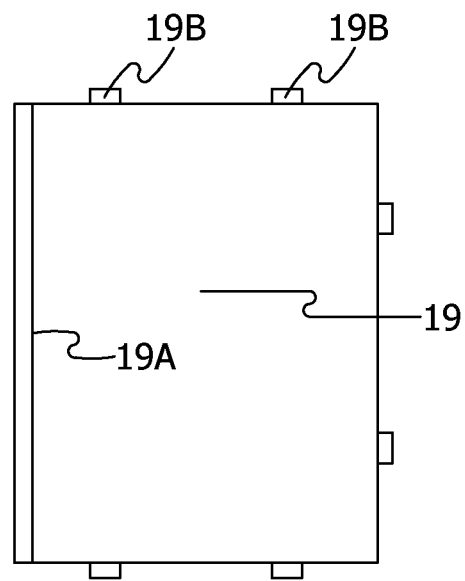
FIG. 8. Is a plan view of the cover with tabs for folders that require sealing.

FIG. 8. Is a plan view of the cover 19 with flanges 19B. The tabs 19B are to seal the folder with glue if required. The fold line 19A is for opening and closing the cover 19.

Figure 9A:
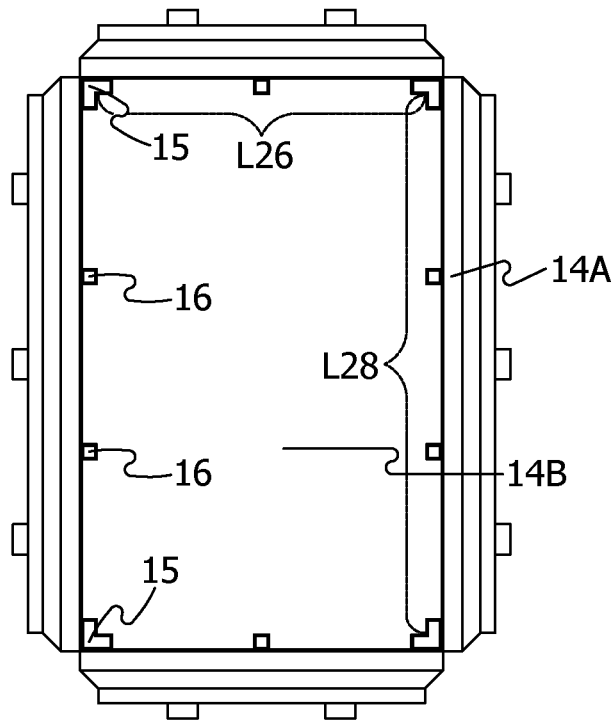
FIG. 9A. Is a plan view of the unfolded outer sheet, the inner sheet and the layout of the columns of the tray for holding legal-size documents.

FIG. 9A. Is a plan view of the unfolded outer sheet 14A, the inner sheet 14B and the distribution of the columns 15,16 of the tray to contain legal-size documents.

The distance L26 will be 8.5 inches plus a slight clearance for legal size trays and binders. The distance L28 will be 14 inches plus a small clearance for legal size trays and binders.

Figure 9B:
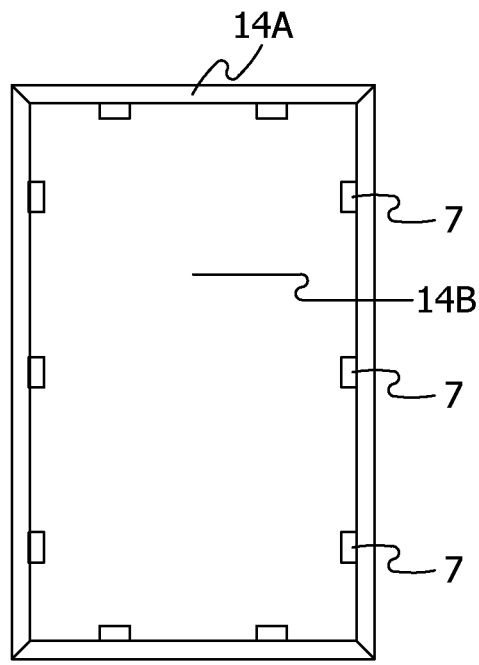
FIG. 9B. Is a plan view of the folded outer sheet and inner sheet of the tray for holding legal-size documents.

FIG. 9B. Is a plan view of the folded outer sheet 14A and inner sheet 14B of the tray for holding legal-size documents. The tabs 7 are glued to the inner sheet 14B.

Figure 10:
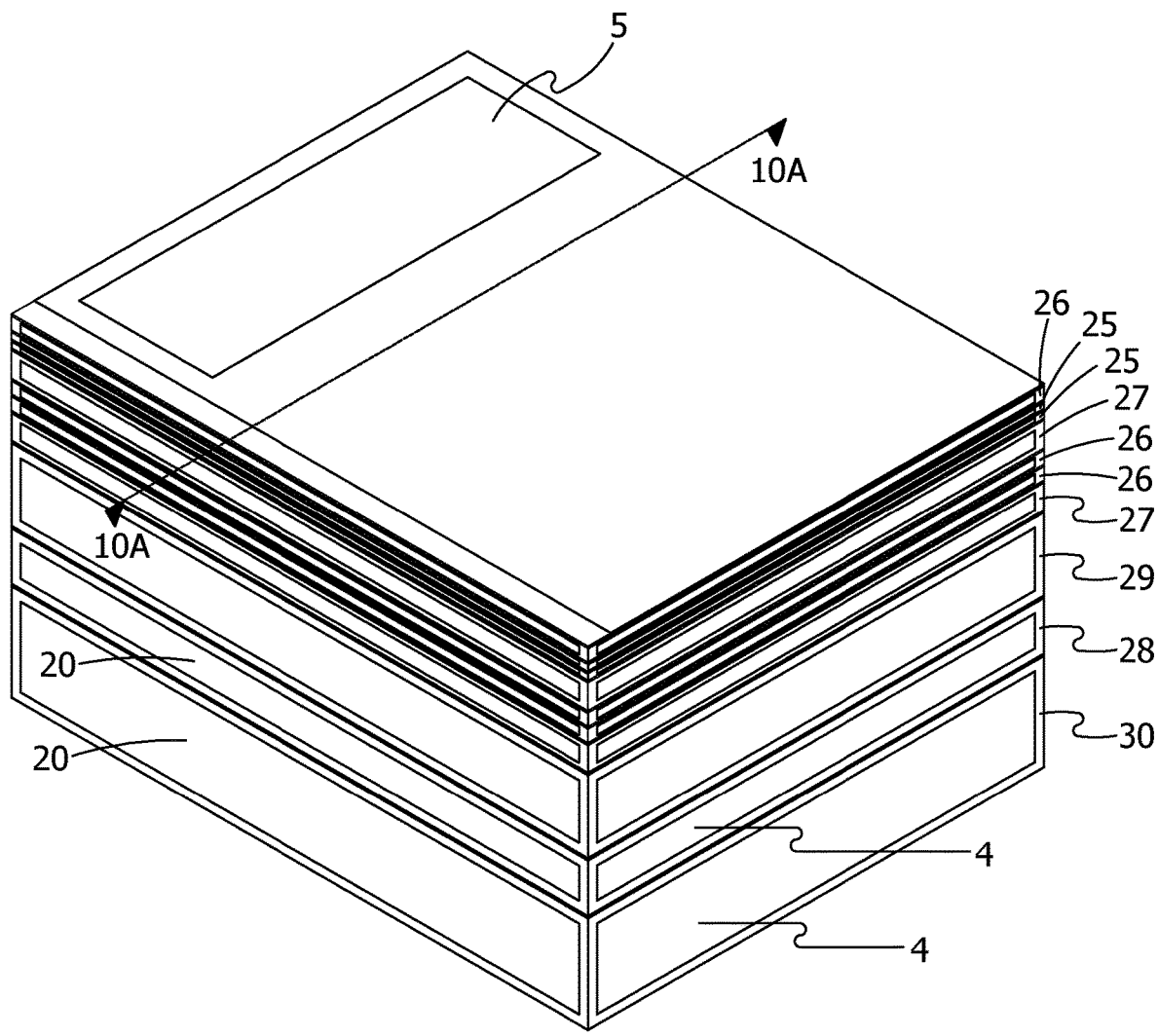
FIG. 10. Shows a perspective view of the folders of different heights, stacked one on top of the other and with the side labels.

FIG. 10. Shows a perspective view of the folders 25,26, 27,28,29,30 of different heights, stacked one on top of the other and with the side labels 4,20. The folder 25 could be ⅛ inch high. The folder 26 could be ¼ inch high. The folder 27 could be ½ inch high. The folder 28 could be 1 inch high. The folder 29 could be 1.5 inches high. The folder 30 could be 2 inches high.

Figure 10A:
FIG. 10A. Shows a sectional view of the folders of different heights, stacked one on top of the other.

FIG. 10A. Shows a sectional view of the folders 25,26, 27,28,29,30 of different heights, stacked one on top of the other. In this view it can be seen that the inner sheet 2 is supported on the columns and the columns are supported one on top of the other.

The thickness of the inner sheet 2 will vary depending on the number of sheets 21 that it has to support, this thickness must be that required so that the inner sheet 2 can support the sheets 21 without being deflected or the deflection due to the load of the leaves 21 is minimal.

Figure 10B:
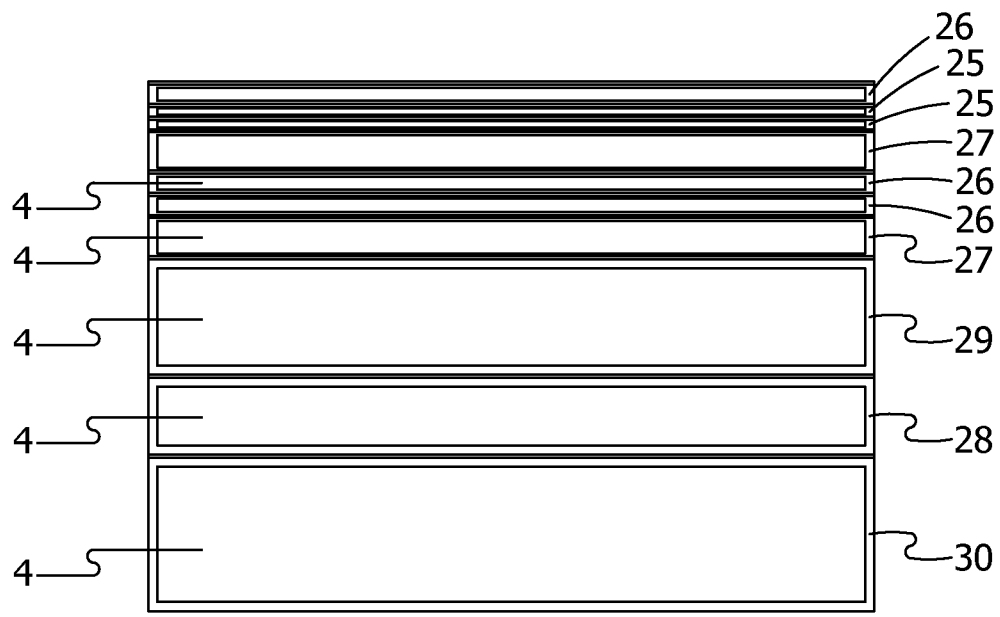
FIG. 10B. Shows an elevation view of the folders of different heights, stacked one on top of the other and with the side labels.

FIG. 10B. Shows an elevation view of the folders 25,26, 27,28,29,30 of different heights, stacked one on top of the other and with the side labels 4.

What is claimed is:

1. A set of stackable trays and stackable folders for filing: each of the stackable trays of the set comprising:
    an inner sheet, an outer sheet, and columns, wherein the inner sheet and the outer sheet are independent sheets, wherein the inner sheet has four sides and four corners, wherein the columns are glued to the inner sheet, wherein the outer sheet comprises folding tabs folded around the inner sheet and the columns, wherein the folding tabs are glued to the columns and the inner sheet, wherein the columns are equally distributed at midpoints of the four sides of the inner sheet and on the four corners of the inner sheet, and
    wherein the folding tabs of the outer sheet of the stackable trays include horizontal tabs configured to form a frame that is parallel to the inner sheet of the stackable trays; and
    each of the stackable file folders of the set comprising:
    an inner sheet, an outer sheet, columns, and a cover sheet, wherein the inner sheet, the outer sheet and the cover sheet are independent sheets, wherein the inner sheet has four sides and four corners,
    wherein the columns are glued to the inner sheet, wherein the outer sheet comprises folding tabs folded around the inner sheet and the columns,
    wherein the folding tabs are glued to the columns and the inner sheet,
    wherein the columns are equally distributed at midpoints of the four sides of the inner sheet and on the four corners of the inner sheet,
    wherein the folding tabs of the outer sheet of the stackable folders include horizontal tabs configured to form a frame that is parallel to the inner sheet of the stackable folders, and wherein the cover sheet is glued to a portion of the frame.

2. The set of stackable trays and stackable folders for filing according to claim 1, wherein when a second stackable tray or a second stackable folder of the set is stacked on top of a first stackable tray or a first stackable folder of the set, the columns of the second stackable tray or the second stackable folder are configured to rest one on top of the columns of the first stackable tray or the first stackable folder.

3. The set of stackable trays and stackable folders for filing according to claim 1, wherein the columns of the stackable trays and the stackable folders are hollow or solid.

4. The set of stackable trays and stackable folders for filing according to claim 1, wherein each of the stackable trays and the stackable folders have four sides that are reinforced in the same way through equally distributed columns at the midpoints of the four sides of the inner sheet of the stackable trays and the stackable folders and on the four corners of the inner sheet of the stackable trays and the stackable folders.

5. The set of stackable trays and stackable folders for filing according to claim 1, wherein the inner sheet of the stackable trays and the stackable folders has a thickness dependent on a quantity of paper documents to be supported.

6. The set of stackable trays and stackable folders for filing according to claim 1, wherein the frame of the folding tabs of the outer sheet of the stackable trays and stackable folders covers an upper face of the columns of the stackable trays and the stackable folders and serves as a support surface for the stackable trays and the stackable folders of the set when stacked.

7. The set of stackable trays and stackable folders for filing according to claim 1, wherein the stackable trays and the stackable folders have a heights selected from: $1/8$, $1/4$, $1/2$, 1, 1.5 or 2 inches.

8. The set of stackable trays and stackable folders for filing according to claim 1, wherein the stackable trays and the stackable folders have a size configured to file documents of different sizes selected from: letter, half letter, legal and tabloid.

\* \* \* \* \*